(12) United States Patent
Wada

(10) Patent No.: US 11,389,967 B2
(45) Date of Patent: Jul. 19, 2022

(54) THREE-DIMENSIONAL SHAPE MEASUREMENT SYSTEM AND THREE-DIMENSIONAL SHAPE MEASUREMENT METHOD

(71) Applicant: FANUC CORPORATION, Yamanashi (JP)

(72) Inventor: Jun Wada, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 303 days.

(21) Appl. No.: 16/751,671

(22) Filed: Jan. 24, 2020

(65) Prior Publication Data

US 2020/0246979 A1 Aug. 6, 2020

(30) Foreign Application Priority Data

Feb. 1, 2019 (JP) .............................. JP2019-017173

(51) Int. Cl.

| | |
|---|---|
| *G06T 7/73* | (2017.01) |
| *B25J 13/08* | (2006.01) |
| *G06T 1/00* | (2006.01) |
| *G06T 1/20* | (2006.01) |
| *G06T 17/00* | (2006.01) |
| *G06T 1/60* | (2006.01) |

(52) U.S. Cl.
CPC .............. *B25J 13/08* (2013.01); *G06T 1/0007* (2013.01); *G06T 1/20* (2013.01); *G06T 7/73* (2017.01); *G06T 17/00* (2013.01); *G06T 1/60* (2013.01)

(58) Field of Classification Search
CPC ........ B25J 13/08; B25J 19/021; B25J 9/1697; B25J 9/1602; G06T 1/0007; G06T 1/20; G06T 7/73; G06T 17/00; G06T 1/60; G06T 3/4038; G06T 19/00; G06T 2200/04; G06T 2207/10016; G06T 2207/10028; G06T 2207/30164; G06T 7/33; G01B 11/24
See application file for complete search history.

(56) References Cited

U.S. PATENT DOCUMENTS 9,779,546 B2 * 10/2017 Hunt ...................... G01B 11/00
9,841,311 B2 * 12/2017 McCloskey ............ G01B 11/00
(Continued)

FOREIGN PATENT DOCUMENTS

| JP | 2011-011330 A | 1/2011 |
|---|---|---|
| JP | 2011112401 A | 6/2011 |

(Continued)

*Primary Examiner* — Christopher M Brandt
(74) *Attorney, Agent, or Firm* — Robert P. Michal, Esq.; Carter, DeLuca & Farrell LLP

(57) ABSTRACT

A three-dimensional shape measurement system includes: an articulated robot having a plurality of axes; at least one three-dimensional vision sensor mounted to the articulated robot and configured to measure a three-dimensional shape of an object to be imaged; a storage unit configured to store distance images representing the three-dimensional shape measured respectively in a plurality of measurement areas including an overlap region; and an integrating unit configured to integrate the plurality of distance images stored in the storage unit in such a manner that parts of the distance images corresponding to the overlap region are superimposed on each other, to thereby generate an integrated distance image.

13 Claims, 8 Drawing Sheets

(56) References Cited

U.S. PATENT DOCUMENTS

| | | | |
|---|---|---|---|
| 2004/0081352 A1* | 4/2004 | Ban | G01B 11/24 |
| | | | 382/154 |
| 2008/0075326 A1* | 3/2008 | Otani | G01C 11/06 |
| | | | 382/106 |
| 2010/0312393 A1 | 12/2010 | Someya | |
| 2014/0021259 A1* | 1/2014 | Moed | G01B 11/06 |
| | | | 235/472.01 |
| 2014/0071305 A1* | 3/2014 | Hiasa | H04N 5/232939 |
| | | | 348/218.1 |
| 2017/0018094 A1* | 1/2017 | Todeschini | H04N 13/204 |
| 2018/0215046 A1 | 8/2018 | Oe | |
| 2020/0242793 A1* | 7/2020 | Fernandez-Dorado | |
| | | | G06F 3/04883 |
| 2021/0089040 A1* | 3/2021 | Ebrahimi Afrouzi | |
| | | | A47L 9/2894 |
| 2021/0354302 A1* | 11/2021 | Bathala | G05D 1/024 |

FOREIGN PATENT DOCUMENTS

| | | |
|---|---|---|
| JP | 2014-215039 A | 11/2014 |
| JP | 2016011930 A | 1/2016 |
| JP | 2016-192135 A | 11/2016 |
| JP | 2018161700 A | 10/2018 |
| WO | 2018079789 A1 | 5/2018 |

\* cited by examiner

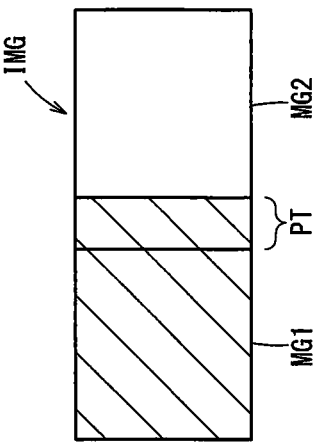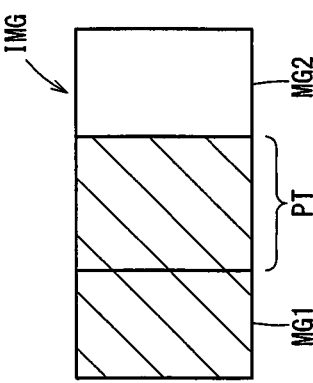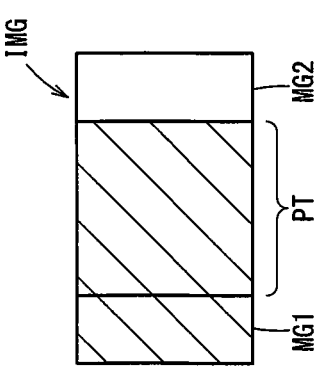

THREE-DIMENSIONAL SHAPE MEASUREMENT SYSTEM AND THREE-DIMENSIONAL SHAPE MEASUREMENT METHOD

CROSS-REFERENCE TO RELATED APPLICATION

This application is based upon and claims the benefit of priority from Japanese Patent Application No. 2019-017173 filed on Feb. 1, 2019, the contents of which are incorporated herein by reference.

BACKGROUND OF THE INVENTION

Field of the Invention

The present invention relates to a three-dimensional shape measurement system and a three-dimensional shape measurement method for measuring a three-dimensional shape of an object.

Description of the Related Art

Japanese Laid-Open Patent Publication No. 2011-011330 discloses a method in which image processing is applied to images captured from a camera so as to obtain position and attitude of a workpiece, in order to control operation of a robot having an end effector attached to the distal end of a robot arm on the basis of the position and attitude thus obtained.

SUMMARY OF THE INVENTION

However, when the measured object is a container in which a plurality of workpieces are stored, for example, the measured object may be too large to fit into the camera's field of view. In this case, the technique of Japanese Laid-Open Patent Publication No. 2011-011330 will miss part of information for obtaining the position and attitude of the workpieces.

Accordingly, an object of the present invention is to provide a three-dimensional shape measurement system and a three-dimensional shape measurement method that can generate three-dimensional information about an object even if the object is relatively large-sized.

According to a first aspect of the present invention, a three-dimensional shape measurement system includes: an articulated robot having a plurality of axes; at least one three-dimensional vision sensor mounted to the articulated robot and configured to measure a three-dimensional shape of an object to be imaged; a storage unit configured to store distance images representing the three-dimensional shape measured respectively in a plurality of measurement areas including an overlap region; and an integrating unit configured to integrate the plurality of distance images stored in the storage unit in such a manner that parts of the distance images corresponding to the overlap region are superimposed on each other, to thereby generate an integrated distance image.

A second aspect of the present invention is directed to a three-dimensional shape measurement method for a three-dimensional shape measurement system including an articulated robot having a plurality of axes, and at least one three-dimensional vision sensor mounted to the articulated robot and configured to measure a three-dimensional shape of an object to be imaged. The three-dimensional shape measurement method includes: a storing step of storing, in a storage unit, distance images representing the three-dimensional shape measured respectively in a plurality of measurement areas including an overlap region; and an integrating step of integrating the plurality of distance images stored in the storage unit in such a manner that parts of the distance images corresponding to the overlap region are superimposed on each other, to thereby generate an integrated distance image.

According to the present invention, information that represents a three-dimensional shape of an object (an integrated distance image) can be generated even if the object is too large to fit within one measurement area, thereby making it possible to generate three-dimensional information on a relatively large-sized object.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7A is a conceptual diagram showing an example display (1) of an overlap region, FIG. 7B is a conceptual diagram showing an example display (2) of the overlap region, and FIG. 7C is a conceptual diagram showing an example display (3) of the overlap region.

DESCRIPTION OF THE PREFERRED EMBODIMENTS

The present invention will be described in detail below referring to the accompanying drawings in conjunction with preferred embodiments.

Embodiment

Figure 1:
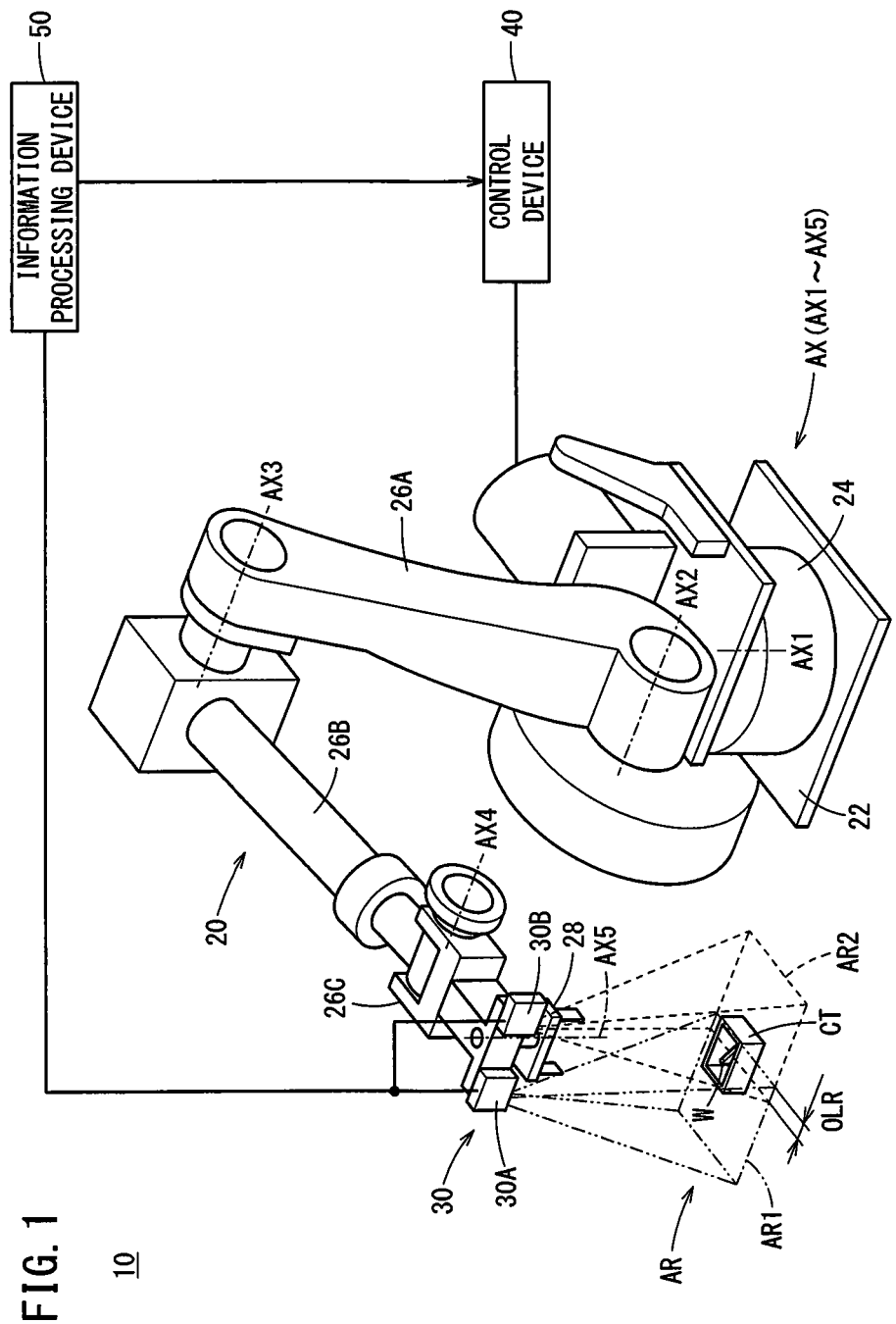
FIG. 1 is a schematic diagram illustrating the configuration of a three-dimensional shape measurement system according to an embodiment.

FIG. 1 is a schematic diagram illustrating the configuration of a three-dimensional shape measurement system 10 according to this embodiment. The three-dimensional shape measurement system 10 includes an articulated robot 20, a plurality of three-dimensional vision sensors 30, a control device 40, and an information processing device 50.

The articulated robot 20 is an industrial robot that has a plurality of axes AX. Specifically, the articulated robot 20 can be a vertically articulated robot, a horizontally articulated robot, a parallel link robot, or the like.

In this embodiment, the articulated robot 20 is a vertically articulated robot, and the plurality of axes AX include five axes, i.e., a pivot axis AX1, a first joint axis AX2, a second joint axis AX3, a third joint axis AX4, and a hand rotation axis AX5.

The pivot axis AX1 pivotably couples a pivoting portion 24 to a base 22, where the pivoting portion 24 turns in accordance with rotation of a motor for driving the pivot axis AX1. The first joint axis AX2 couples a first link 26A rotatably to the pivoting portion 24, where the first link 26A turns in accordance with rotation of a motor for driving the first joint axis AX2.

The second joint axis AX3 rotatably couples a second link 26B to the first link 26A, where the second link 26B turns in accordance with rotation of a motor for driving the second joint axis AX3. The third joint axis AX4 rotatably couples a third link 26C to the second link 26B, where the third link 26C turns in accordance with rotation of a motor for driving the third joint axis AX4.

The hand rotation axis AX5 rotatably couples a hand portion 28 to the third link 26C, where the hand portion 28 turns in accordance with rotation of a motor for driving the hand rotation axis AX5. The hand portion 28 holds (or grips) an object to be conveyed, W, and releases the held conveyed object W. The hand portion 28 may hold the conveyed object W by pinching the conveyed object W, or may hold the conveyed object W by sucking the conveyed object W.

The gripping or releasing operation of the hand portion 28 is controlled by the control device 40. The above-mentioned motors for driving the pivot axis AX1, first joint axis AX2, second joint axis AX3, third joint axis AX4, and hand rotation axis AX5 are also controlled by the control device 40.

Each of the multiple three-dimensional vision sensors 30 is configured to measure the three-dimensional shape of an object and mounted to the articulated robot 20. Each three-dimensional vision sensor 30 includes a sensor device having measurement points at a plurality of pixels and is configured to measure the three-dimensional shape of an object placed within a measurement area AR by using the sensor device. The measurement method of the three-dimensional vision sensors 30 may be a ToF (Time of Flight) method or a triangulation method.

In this embodiment, the two three-dimensional vision sensors 30 are mounted to the articulated robot 20, and one of the two three-dimensional vision sensors 30 is referred to as three-dimensional vision sensor 30A and the other of the two three-dimensional vision sensors 30 is referred to as three-dimensional vision sensor 30B. Also, the measurement area AR of the three-dimensional vision sensor 30A is referred to as measurement area AR1 and the measurement area AR of the three-dimensional vision sensor 30B is referred to as measurement area AR2.

The measurement area AR1 of the three-dimensional vision sensor 30A and the measurement area AR2 of the three-dimensional vision sensor 30B have an overlap region OLR. Three-dimensional shape can be measured in an area defined by combining the individual measurement areas AR1, AR2 through the overlap region OLR. That is, three-dimensional shape can be actually measured in an expanded area. This enables measurement of larger three-dimensional shapes.

In this embodiment, the object to be imaged by the two three-dimensional vision sensors 30A, 30B is a container CT that can accommodate a plurality of conveyed objects W. The container CT is opened in the upward direction opposite to the downward direction in which gravity acts. The container CT is smaller than the area defined by combining the measurement areas AR1, AR2 of the two three-dimensional vision sensors 30A, 30B that are located at predetermined given measurement positions, and the container CT is positioned in this area.

The control device 40 is configured to control the articulated robot 20. Specifically, the control device 40 controls the motors for driving the pivot axis AX1, first joint axis AX2, second joint axis AX3, third joint axis AX4, and hand rotation axis AX5, and the holding and releasing operation of the hand portion 28.

In this embodiment, the control device 40 has a measurement mode for measuring the conveyed object W and a conveyance mode for conveying the conveyed object W.

In the measurement mode, the control device 40 individually controls the motors for driving the pivot axis AX1, first joint axis AX2, second joint axis AX3, third joint axis AX4, and hand rotation axis AX5, so as to position the two three-dimensional vision sensors 30A, 30B at given measurement positions.

In the conveyance mode, the control device 40 controls the motors for driving the pivot axis AX1, first joint axis AX2, second joint axis AX3, third joint axis AX4, and hand rotation axis AX5, and the operation of the hand portion 28, so as to convey the conveyed object W from the container CT placed at a given installation site to a specified place.

The information processing device 50 is configured to instruct the control device 40 to control the articulated robot 20 and to execute given processing using measurements from the two three-dimensional vision sensors 30A, 30B. The information processing device 50 can be a general-purpose personal computer.

Figure 2:
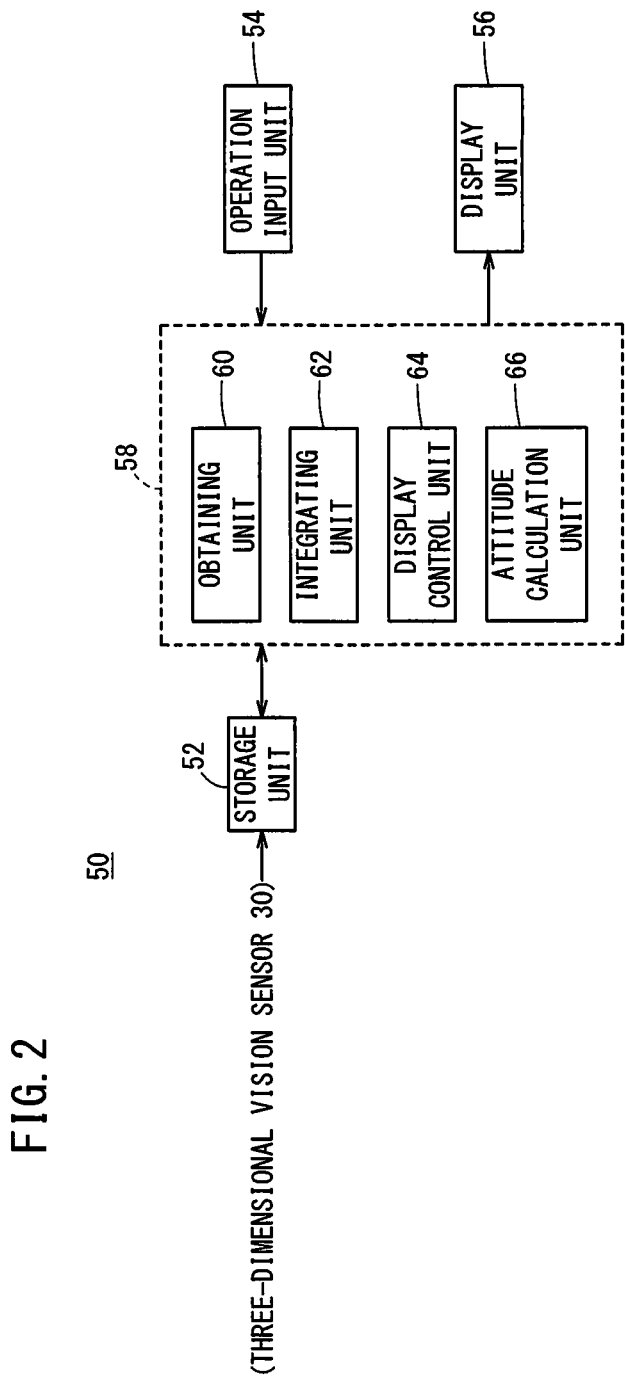
FIG. 2 is a schematic diagram illustrating the configuration of an information processing device.

FIG. 2 is a schematic diagram illustrating the configuration of the information processing device 50. The information processing device 50 includes a storage unit 52 such as a hard disk, an operation input unit 54 such as a mouse and keyboard, a display unit 56 for displaying various information, and a signal processing unit 58.

The signal processing unit 58 is connected with the storage unit 52, operation input unit 54, and display unit 56. The signal processing unit 58 includes a processor such as a CPU (Central Processing Unit) or MPU (Micro Processing Unit), and memory such as ROM (Read Only Memory) and RAM (Random Access Memory). As the processor executes a program stored in the memory, the signal processing unit 58 functions as an obtaining unit 60, an integrating unit 62, a display control unit 64, and an attitude calculation unit 66 and executes various processing in accordance with operations on the operation input unit 54.

Figure 3:
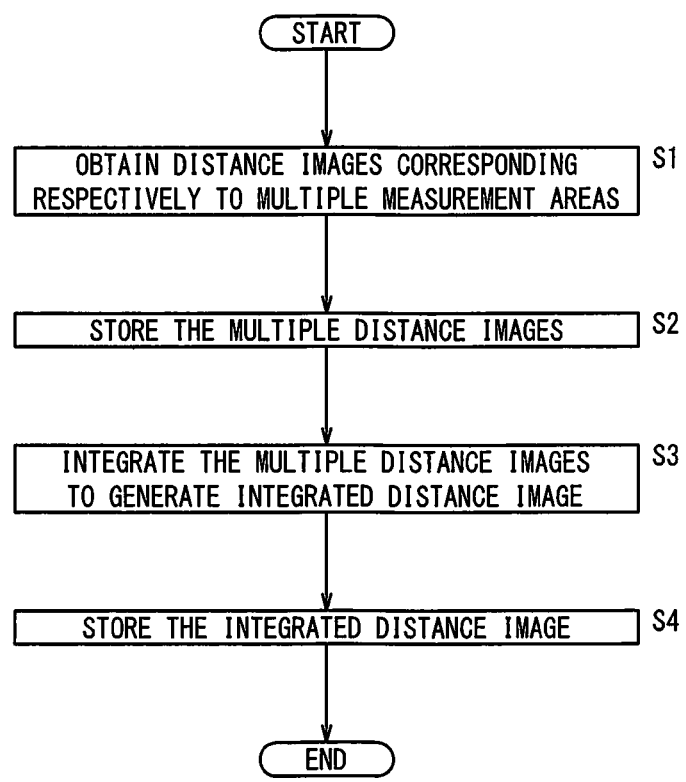
FIG. 3 is a flowchart showing the flow of measurement processing.

The measurement processing executed by the signal processing unit 58 in accordance with measurement operations will be described. FIG. 3 is a flowchart showing the flow of the measurement processing.

At step S1, the obtaining unit 60 gives a command for execution of the measurement mode to the control device 40 to cause the control device 40 to execute the measurement mode and thereby places the two three-dimensional vision sensors 30A, 30B at given measurement positions.

Figure 4:
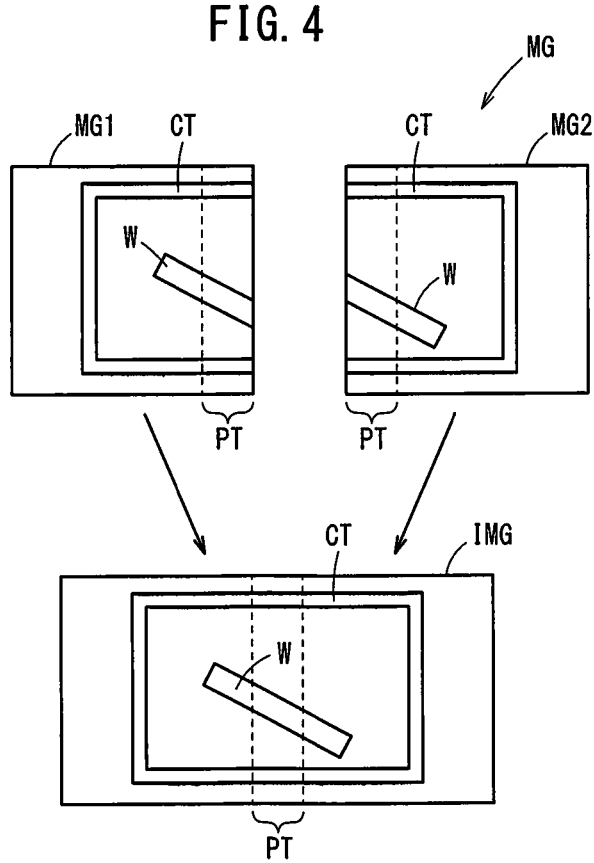
FIG. 4 is a conceptual diagram illustrating distance images and an integrated distance image.

Then, as shown in FIG. 4, the three-dimensional vision sensor 30A outputs, as the result of measurement, a distance image MG1 that represents a three-dimensional shape of the object including part of the container CT placed within the measurement area AR1 (see FIG. 1) of the three-dimensional vision sensor 30A. Further, as the result of measurement, the three-dimensional vision sensor 30B outputs a distance image MG2 that represents a three-dimensional shape including part of the container CT placed within the measurement area AR2 (see FIG. 1) of the three-dimensional vision sensor 30B.

Each of the multiple distance images MG (MG1, MG2) is three-dimensional information that represents the measured three-dimensional shape and includes coordinate information about each of multiple pixels (measurement points) and distance information indicating the distance from each pixel to the object.

The obtaining unit 60 thus obtains the distance image MG1 in the measurement area AR1 captured by the three-dimensional vision sensor 30A placed at the given measurement position and the distance image MG2 in the measurement area AR2 captured by the three-dimensional vision sensor 30B placed at the measurement position, and then the process moves to step S2.

At step S2, the obtaining unit 60 stores the distance images MG1, MG2 obtained at step S1 into the storage unit 52 and then the process moves to step S3.

At step S3, as shown in FIG. 4, the integrating unit 62 integrates the two distance images MG1, MG2 stored in the storage unit 52. Specifically, the integrating unit 62 integrates the two distance images MG1, MG2 in such a manner that parts PT of the distance images corresponding to the overlap region OLR (see FIG. 1) are superimposed on each other to thereby generate an integrated distance image IMG. The integrated distance image IMG is information that represents a larger three-dimensional shape than each distance image MG1, MG2 since this integrated distance image IMG is generated by integrating the multiple distance images MG1, MG2 partially overlapped.

Figure 5:
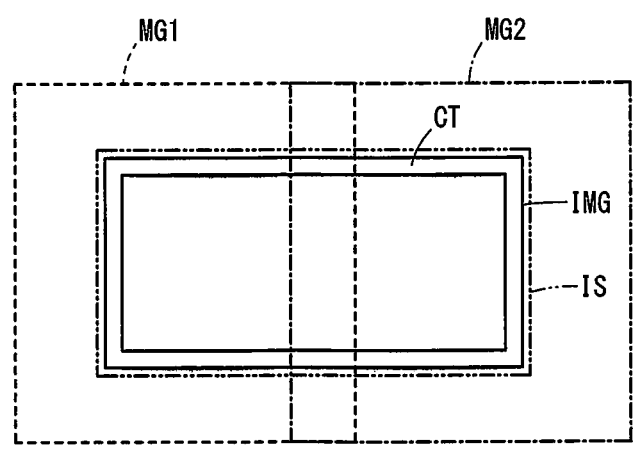
FIG. 5 is a conceptual diagram illustrating an integrated distance image in which a section to be integrated is specified.

As shown in FIG. 5, when an operator specifies an area within which to perform integration (which will be hereinafter referred to as an integration area IS) by operating the operation input unit 54, the integrating unit 62 performs the integration by using, as integration targets (targets to be integrated), portions (distance image portions) of the two distance images MG1, MG2 stored in the storage unit 52 that lie within the specified integration area IS. This reduces the load of the integrating processing as compared to cases where the entireties of the two distance images MG1, MG2 (the area surrounded by dashed line plus the area surrounded by one-dot-chain line in FIG. 5) are used as the integration targets.

In this embodiment, the outer frame of the container CT is specified as the integrated area IS. Accordingly, it is possible to avoid erroneous detection of the conveyed object W and to omit information processing on the portions unnecessary for the calculation of attitude etc. of the conveyed object W.

The integrating unit 62 thus generates the integrated distance image IMG and then the process moves to step S4. At step S4, the integrating unit 62 stores the integrated distance image IMG generated at step S3 into the storage unit 52. The measurement processing thus ends.

In this way, the signal processing unit 58 integrates the distance images MG1, MG2 corresponding to the multiple measurement areas AR1, AR2 having the overlap region OLR and hence can generate three-dimensional information on a relatively large-sized object.

Figure 6:
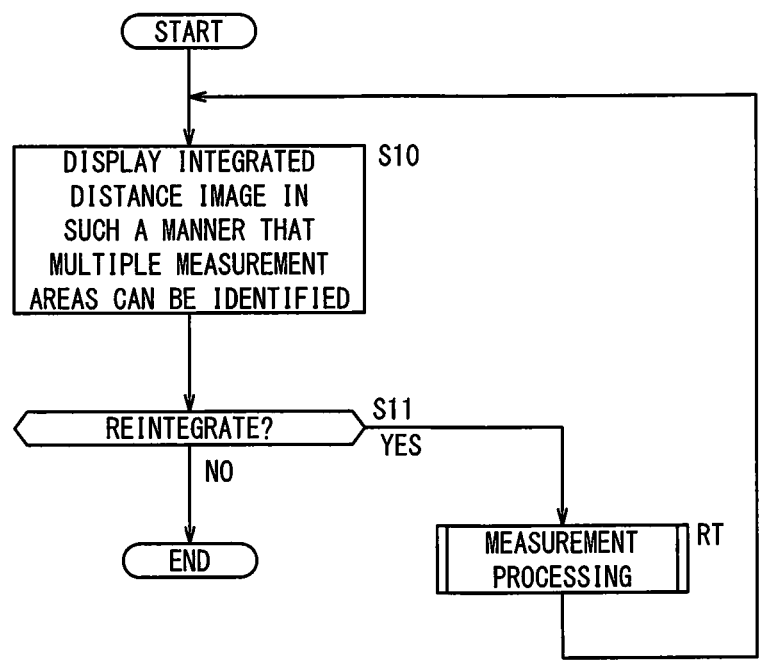
FIG. 6 is a flowchart showing the flow of setting assist processing.

Next, a description will be given concerning setting assist processing that is performed by the signal processing unit 58 in accordance with a setting assist operation to assist setting of the overlap region OLR. The setting assist processing is executed after the above-described measurement processing was performed at least once and the distance images MG1, MG2 and integrated distance image IMG have been stored in the storage unit 52. FIG. 6 is a flowchart showing the flow of the setting assist processing.

At step S10, on the basis of the distance images MG1, MG2 and integrated distance image IMG stored in the storage unit 52, the display control unit 64 displays the integrated distance image IMG, for example as shown in FIG. 7A, in such a manner that the measurement areas AR1, AR2 (see FIG. 1) can be identified.

Specifically, the measurement areas AR1, AR2 may be displayed in identifiable manners as shown below, for example. That is, as illustrated in FIG. 7A, the display control unit 64 may display the measurement areas AR1, AR2 in an identifiable manner by hatching one of the distance image MG1 of the measurement area AR1 and the distance image MG2 of the measurement area AR2. Alternatively, for example, the display control unit 64 may display the measurement areas AR1, AR2 in an identifiable manner by color-coding the distance image MG1 of the measurement area AR1 and the distance image MG2 of the measurement area AR2.

Displaying the integrated distance image IMG such that the measurement areas AR1, AR2 can be identified in this way allows the operator to check the parts PT of the measurement areas AR1, AR2 that correspond to the overlap region OLR (see FIG. 1). The operator can then determine whether to adjust the measurement positions of the three-dimensional vision sensors 30 according to the size of the parts PT.

At step S11, the obtaining unit 60 waits until it receives a command to reintegrate the distance images or a command not to reintegrate them from the operation input unit 54. The display control unit 64 may display buttons for inputting such commands at step S10 together with the integrated distance image IMG.

Receiving the command to reintegrate the distance images means that the operator intends to adjust the measurement positions of the three-dimensional vision sensors 30 and check the parts PT corresponding to the overlap region OLR (see FIG. 1) after the adjustment. In this case, the obtaining unit 60 moves to a measurement processing routine RT. In the measurement processing routine RT, the obtaining unit 60 and the integrating unit 62 execute the above-described measurement processing (see FIG. 3) and then the process returns to step S10.

Thus, an integrated distance image IMG is newly generated by the execution of the measurement processing routine RT and displayed as shown in FIG. 7B or 7C. The operator then can check the parts PT that correspond to the overlap region OLR (see FIG. 1) generated after the adjustment. That is, the operator can adjust the measurement positions of the three-dimensional vision sensors 30 while checking the overlap region OLR (see FIG. 1).

The integrated distance image IMG stored in the storage unit 52 before the execution of the measurement processing routine RT is updated to the integrated distance image IMG newly generated by the execution of the measurement processing routine RT. Also, the distance images MG1, MG2 stored in the storage unit 52 before the execution of the measurement processing routine RT are updated to the distance images MG1, MG2 newly obtained by the execution of the measurement processing routine RT.

On the other hand, receiving the command not to reintegrate the images means that it is not necessary to adjust the measurement positions of the three-dimensional vision sensors 30 or to reconfirm the parts PT corresponding to the overlap region OLR (see FIG. 1) after the adjustment. In this case, the obtaining unit 60 terminates the setting assist processing without proceeding to the measurement processing routine RT.

Next, attitude calculation processing will be described which is executed by the attitude calculation unit 66 in accordance with an attitude calculating operation to calculate attitude of the conveyed object W. The attitude calculation unit 66 executes the attitude calculation processing based on the integrated distance image IMG stored in the storage unit 52. Specifically, the attitude calculation unit 66 applies image processing to the integrated distance image IMG to detect the conveyed object W contained in the integrated distance image IMG and calculates the attitude of the detected conveyed object W by using a known calculation method.

After calculating the attitude of the conveyed object W, the attitude calculation unit 66 generates attitude information indicating the calculated attitude of the conveyed object W and outputs the generated attitude information to the control device 40. In the conveyance mode, on the basis of the attitude information, the control device 40 controls the motors for driving the pivot axis AX1, first joint axis AX2, second joint axis AX3, third joint axis AX4, and hand rotation axis AX5 and the operation of the hand portion 28. The conveyed object W is thus conveyed from the container CT placed at a given installation position to a place specified.

[Modifications]

The embodiment has been described as an example of the present invention and the technical scope of the present invention is not limited to the scope described in the embodiment. The above-described embodiment can of course be modified or improved in various manners. It is clear from recitation of claims that such modified or improved embodiments are also included in the technical scope of the present invention.

Some of modified or improved embodiments will be described below as modifications. Constituent elements equivalent to those described in the embodiment above are labeled using the same reference numerals and will not be described again.

<First Modification>

In the embodiment above, the articulated robot 20 is provided with the plurality of three-dimensional vision sensors 30 (two three-dimensional vision sensors 30A, 30B). However, the articulated robot 20 may be provided with a single three-dimensional vision sensor 30.

When a single three-dimensional vision sensor 30 is mounted to the articulated robot 20, the control device 40 controls the articulated robot 20 in the measurement mode so that the three-dimensional vision sensor 30 moves to positions where it can measure the multiple measurement areas AR1, AR2.

In this case, at step S1 (see FIG. 3), the obtaining unit 60 gives a measurement mode execution command to the control device 40 to cause the control device 40 to execute the measurement mode. Thus, the obtaining unit 60 can obtain distance images MG1, MG2 as the results of measurement conducted with the single three-dimensional vision sensor 30 located at positions where it can measure the multiple measurement areas AR1, AR2.

In this way, as in the embodiment described above, it is possible to obtain distance images MG1, MG2 respectively of multiple measurement areas AR1, AR2 even with a single three-dimensional vision sensor 30 provided to the articulated robot 20. The number of three-dimensional vision sensor(s) 30 can thus be reduced in the first modification.

<Second Modification>

Figure 8:
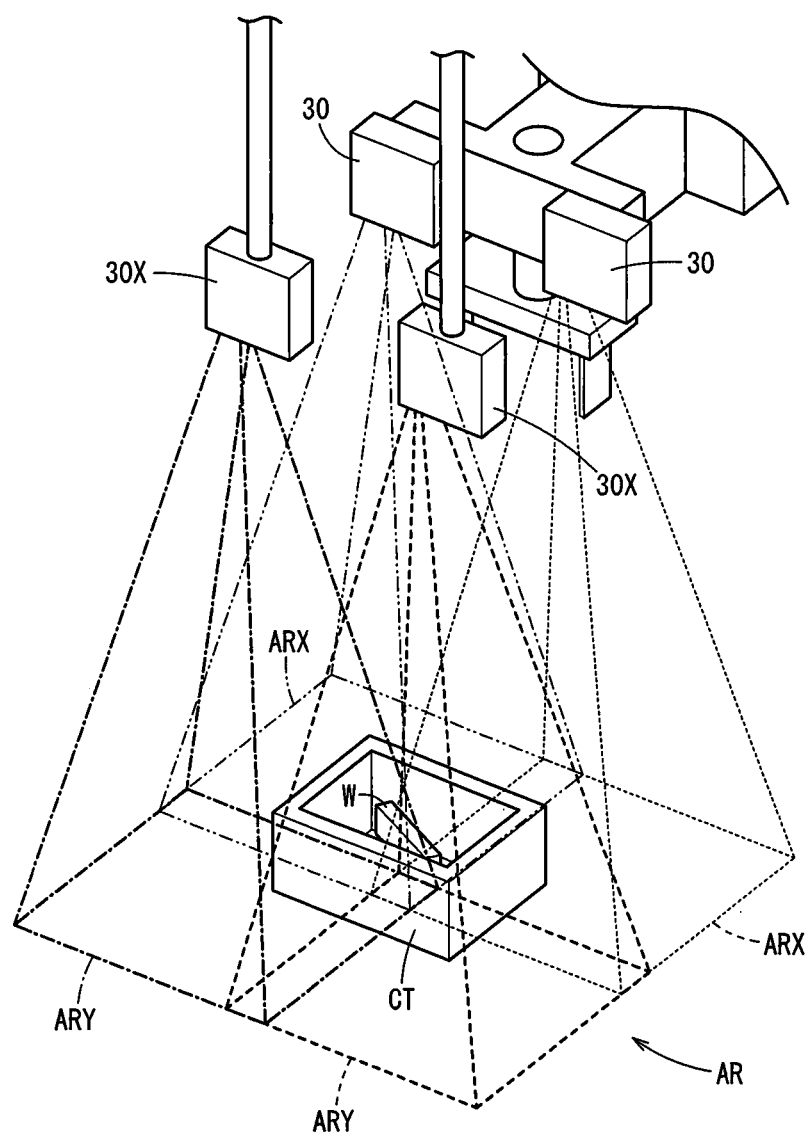
FIG. 8 is a schematic diagram illustrating the addition of second three-dimensional vision sensors to the three-dimensional shape measurement system of FIG. 1.

In the embodiment above, the plurality of three-dimensional vision sensors 30 are mounted to the articulated robot 20. However, as shown in FIG. 8, while the three-dimensional vision sensors 30 are mounted to the articulated robot 20, second three-dimensional vision sensors 30X may be installed in an immovable state at positions different from the articulated robot 20. Each of the number of the three-dimensional vision sensor(s) 30 and the number of the second three-dimensional vision sensor(s) 30X may be one, or two or more. That is, a plurality of measurement areas AR are measured by using at least one three-dimensional vision sensor 30 and at least one second three-dimensional vision sensor 30X.

This second modification uses two three-dimensional vision sensors 30 and two second three-dimensional vision sensors 30X. The plurality of measurement areas AR include four areas, i.e., two first measurement areas ARX that are measured by the three-dimensional vision sensors 30 and two second measurement areas ARY measured by the second three-dimensional vision sensors 30X.

In the measurement mode, the control device 40 of this second modification controls the articulated robot 20 so that the two three-dimensional vision sensors 30 move to positions where the two first measurement areas ARX, among the multiple measurement areas AR, can be individually measured.

On the other hand, the obtaining unit 60 gives a measurement mode execution command to the control device 40 at step S1 (see FIG. 3) to cause the control device 40 to execute the measurement mode, thereby obtaining distance images MG of the two first measurement areas ARX. The obtaining unit 60 also obtains distance images MG of the second measurement areas ARY respectively from the fixed, second three-dimensional vision sensors 30X.

In this way, it is possible to obtain distance images MG of some (first measurement areas ARX) of the multiple measurement areas AR from the three-dimensional vision sensors 30 of the articulated robot 20 and also obtain distance images MG of the others (second measurement areas ARY) of the multiple measurement areas AR from the immovable, second three-dimensional vision sensors 30X.

Thus, in this second modification, when a plurality of measurement areas AR are defined respectively at a plurality of mutually separated installation sites where a container CT is located, it is possible to obtain distance images MG of some (first measurement areas ARX) of the plurality of measurement areas AR positioned at the respective installation sites by using the three-dimensional vision sensor(s) 30 mounted to the single articulated robot 20.

<Third Modification>

In the embodiment above, the information processing device 50 includes the storage unit 52, operation input unit 54, display unit 56, obtaining unit 60, integrating unit 62, display control unit 64, and attitude calculation unit 66. However, the control device 40 may include some or all of the storage unit 52, operation input unit 54, display unit 56, obtaining unit 60, integrating unit 62, display control unit 64, and attitude calculation unit 66.

<Fourth Modification>

The embodiment and modifications described above can be combined together in arbitrary manners without incurring contradictions.

[Invention Obtainable from Description]

The invention obtainable from the embodiments and modifications above will be recited below.

<First Invention>

A first invention is directed to the three-dimensional shape measurement system (10) including: an articulated robot (20) having a plurality of axes (AX); at least one three-dimensional vision sensor (30) mounted to the articulated robot (20) and configured to measure a three-dimensional shape of an object to be imaged; a storage unit (52) configured to store distance images (MG) representing the three-dimensional shape measured respectively in a plurality of measurement areas (AR) including an overlap region (OLR); and an integrating unit (62) configured to integrate the plurality of distance images (MG) stored in the storage unit (52) in such a manner that parts (PT) of the distance images corresponding to the overlap region (OLR) are superimposed on each other, to thereby generate an integrated distance image (IMG).

Thus, information that represents a three-dimensional shape of an object (an integrated distance image IMG) can be generated even if the object is too large to fit within one measurement area (AR), thereby making it possible to generate three-dimensional information on a relatively large-sized object.

The three-dimensional shape measurement system (10) may further include a display control unit (64) configured to display the integrated distance image (IMG) in such a manner that the plurality of measurement areas (AR) are identifiable. This allows the operator to adjust the measurement position of the three-dimensional vision sensor (30) while checking the overlap region (OLR) between the measurement areas (AR).

The integrating unit (62) may be configured to use, as targets to be integrated, distance image portions that lie within a specified integration area (IS), of the plurality of distance images (MG) stored in the storage unit (52). This reduces the load of the integrating processing as compared to cases where the entireties of the multiple, individual distance images (MG) are used as the targets to the integrated.

The object to be imaged may be a container (CT) that is smaller than an area defining by combining the plurality of measurement areas (AR) and that is configured to accommodate a plurality of conveyed objects (W), and the integration area (IS) may be an outer frame of the container (CT). It is then possible to avoid erroneous detection of the conveyed objects (W) and to omit information processing on areas unnecessary for the calculation of attitude etc. of the conveyed objects (W).

The three-dimensional shape measurement system (10) may further include a control device (40) configured to control the articulated robot (20) so that the three-dimensional vision sensor (30) moves to positions where the plurality of measurement areas (AR) can be measured respectively. It is then possible to reduce the number of three-dimensional vision sensor(s) (30).

The three-dimensional shape measurement system (10) may further include a second three-dimensional vision sensor (30X) provided in an immovable manner at a position different from the articulated robot (20) and configured to measure at least one of the plurality of measurement areas (AR), wherein the control device (40) may be configured to control the articulated robot (20) such that the three-dimensional vision sensor (30) moves to a position where the three-dimensional vision sensor (30) can measure, among the plurality of measurement areas (AR), the measurement area (AR) other than the measurement area (AR) that is measured by the second three-dimensional vision sensor (30X). Accordingly, when a plurality of measurement areas (AR) are defined respectively at a plurality of mutually separated measurement places, it is possible to obtain a distance image (MG) corresponding to part of each of the plurality of measurement areas (AR) at the installation places by using the three-dimensional vision sensor (30) mounted on a single articulated robot (20).

<Second Invention>

A second invention is directed to a three-dimensional shape measurement method for a three-dimensional shape measurement system (10) including an articulated robot (20) having a plurality of axes (AX), and at least one three-dimensional vision sensor (30) mounted to the articulated robot (20) and configured to measure a three-dimensional shape of an object to be imaged. The three-dimensional shape measurement method includes: a storing step (S2) of storing, in a storage unit (52), distance images (MG) representing the three-dimensional shape measured respectively in a plurality of measurement areas (AR) including an overlap region (OLR); and an integrating step (S3) of integrating the plurality of distance images (MG) stored in the storage unit (52) in such a manner that parts (PT) of the distance images corresponding to the overlap region (OLR) are superimposed on each other, to thereby generate an integrated distance image (IMG).

Thus, information that represents a three-dimensional shape of an object (an integrated distance image IMG) can be generated even if the object is too large to fit within one measurement area (AR), thereby making it possible to generate three-dimensional information of a relatively large-sized object.

The three-dimensional shape measurement method may further include a display control step (S10) of displaying the integrated distance image (IMG) in such a manner that the plurality of measurement areas (AR) are identifiable. This allows the operator to adjust the measurement position of the three-dimensional vision sensor (30) while checking the overlap region (OLR) between the measurement areas (AR).

The integrating step (S3) may use, as targets to be integrated, distance image portions that lie within a specified integration area (IS), of the plurality of distance images (MG) stored in the storage unit (52). This reduces the load of the integrating processing as compared to cases where the entireties of the multiple, individual distance images (MG) are used as the targets to the integrated.

The object to be imaged may be a container (CT) that is smaller than an area defining by combining the plurality of measurement areas (AR) and that is configured to accommodate a plurality of conveyed objects (W), and the integration area (IS) may be an outer frame of the container (CT). It is then possible to avoid erroneous detection of the conveyed objects (W) and to omit information processing on areas unnecessary for the calculation of attitude etc. of the conveyed objects (W).

The three-dimensional shape measurement method may further include a control step (S1) of controlling the articulated robot (20) so that the three-dimensional vision sensor (30) moves to positions where the plurality of measurement areas (AR) can be measured respectively. It is then possible to reduce the number of three-dimensional vision sensor(s) (30).

The three-dimensional shape measurement system (10) may further include a second three-dimensional vision sensor (30X) provided in an immovable manner at a position different from the articulated robot (20) and configured to measure at least one of the plurality of measurement areas (AR), and the control step (S1) may control the articulated robot (20) such that the three-dimensional vision sensor (30)

moves to a position where the three-dimensional vision sensor (30) can measure, among the plurality of measurement areas (AR), the measurement area (AR) other than the measurement area (AR) that is measured by the second three-dimensional vision sensor (30X). Accordingly, when a plurality of measurement areas (AR) are defined respectively at a plurality of mutually separated measurement places, it is possible to obtain a distance image (MG) corresponding to part of each of the plurality of measurement areas (AR) positioned at the respective installation places by using the three-dimensional vision sensor (30) mounted on a single

What is claimed is:

1. A three-dimensional shape measurement system comprising:
    an articulated robot having a plurality of axes;
    at least one three-dimensional vision sensor mounted to the articulated robot and configured to measure a three-dimensional shape of an object to be imaged, the at least one three-dimensional vision sensor being configured to output at least first and second distance images, the first distance image representing the three-dimensional shape of the object including a first part of the object measured in a first measurement area, the second distance image representing the three-dimensional shape of the object including a second part of the object measured in a second measurement area, the second part being different from the first part, wherein each of the first and second distance images further includes a common third part of the object corresponding to an overlap region; and
    a processor configured to integrate the first and second distance images in a manner that the common third part of the first and second distance images corresponding to the overlap region are superimposed on each other, to thereby generate an integrated distance image.

2. The three-dimensional shape measurement system according to claim 1, wherein the processor is further configured to display the integrated distance image in a manner that the first and second measurement areas are identifiable.

3. The three-dimensional shape measurement system according to claim 1, wherein the processor is configured to use, as targets to be integrated, distance image portions that lie within a specified integration area, of the first and second distance images.

4. The three-dimensional shape measurement system according to claim 3, wherein the object to be imaged is a container that is smaller than an area defined by combining the first and second measurement areas and that is configured to accommodate a plurality of conveyed objects, and
    the specified integration area is an outer frame of the container.

5. The three-dimensional shape measurement system according to claim 1, wherein the processor is configured to control the articulated robot so that the at least one three-dimensional vision sensor moves to positions where the first and second measurement areas are measured respectively.

6. The three-dimensional shape measurement system according to claim 1, wherein the at least one three-dimensional vision sensor includes a first three-dimensional vision sensor provided in a movable manner, and a second three-dimensional vision sensor provided in an immovable manner at a position different from the articulated robot and configured to measure at least one of the first or second measurement areas, wherein the processor is configured to control the articulated robot so that the first three-dimensional vision sensor moves to a position where the first three-dimensional vision sensor measures, among the first and second measurement areas, the measurement area other than the measurement area that is measured by the second three-dimensional vision sensor.

7. A three-dimensional shape measurement method for a three-dimensional shape measurement system including an articulated robot having a plurality of axes, and at least one three-dimensional vision sensor mounted to the articulated robot and configured to measure a three-dimensional shape of an object to be imaged; the method comprising:
    storing at least first and second distance images, the first distance image representing the three-dimensional shape of the object including a first part of the object measured in a first measurement area the second distance image representing the three-dimensional shape of the object including a second part of the object measured in a second measurement area, the second part being different from the first part, wherein each of the first and second distance images further includes a common third part of the object corresponding to an overlap region; and
    integrating the first and second distance images in a manner that the common third part of the first and second distance images corresponding to the overlap region are superimposed on each other, to thereby generate an integrated distance image.

8. The three-dimensional shape measurement method according to claim 7, further comprising displaying the integrated distance image in a manner that the first and second measurement areas are identifiable.

9. The three-dimensional shape measurement method according to claim 7, wherein the integrating of the first and second distance images includes using, as targets to be integrated, distance image portions that lie within a specified integration area, of the first and second distance images.

10. The three-dimensional shape measurement method according to claim 9, wherein the object to be imaged is a container that is smaller than an area defined by combining the first and second measurement areas and that is configured to accommodate a plurality of conveyed objects, and
    the specified integration area is an outer frame of the container.

11. The three-dimensional shape measurement method according to claim 7, further comprising controlling the articulated robot so that the at least one three-dimensional vision sensor moves to positions where the first and second measurement areas are measured respectively.

12. The three-dimensional shape measurement method according to claim 7, wherein the at least one three-dimensional vision sensor includes a first three-dimensional vision sensor provided in a movable manner, and a second three-dimensional vision sensor provided in an immovable manner at a position different from the articulated robot and configured to measure at least one of the first or second measurement areas, and
    the method further comprising controlling the articulated robot so that the first three-dimensional vision sensor moves to a position where the first three-dimensional vision sensor measures, among the first and second measurement areas, the measurement area other than the measurement area that is measured by the second three-dimensional vision sensor.

13. The three-dimensional shape measurement system according to claim 2, wherein the first and second measurement areas are identifiable by displaying the first and second distance images in a different manner from one another.

\* \* \* \* \*